(12) United States Patent
Li et al.

(10) Patent No.: US 9,196,920 B2
(45) Date of Patent: Nov. 24, 2015

(54) ELECTROCHEMICAL CELL HAVING A SAFETY DEVICE

(71) Applicant: Johnson Controls Technology LLC, Wilmington, DE (US)

(72) Inventors: Feng Li, Troy, MI (US); Thomas M. Watson, Milwaukee, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 398 days.

(21) Appl. No.: 13/631,371

(22) Filed: Sep. 28, 2012

(65) Prior Publication Data
US 2013/0095353 A1 Apr. 18, 2013

Related U.S. Application Data

(60) Provisional application No. 61/548,657, filed on Oct. 18, 2011.

(51) Int. Cl.
| | |
|---|---|
| *H01M 10/52* | (2006.01) |
| *H01M 10/0525* | (2010.01) |
| *H01M 2/12* | (2006.01) |
| *H01M 10/34* | (2006.01) |
| H01M 2/04 | (2006.01) |
| H01M 10/653 | (2014.01) |

(Continued)

(52) U.S. Cl.
CPC ........ *H01M 10/0525* (2013.01); *H01M 2/1276* (2013.01); *H01M 10/345* (2013.01); *H01M 10/52* (2013.01); H01M 2/022 (2013.01); H01M 2/0217 (2013.01); H01M 2/0426 (2013.01); H01M 2/1094 (2013.01); H01M 10/504 (2013.01); H01M 2200/20 (2013.01); H01M 2220/20 (2013.01); Y02E 60/122 (2013.01); Y02E 60/124 (2013.01)

(58) Field of Classification Search
None
See application file for complete search history.

(56) References Cited

U.S. PATENT DOCUMENTS

| | | |
|---|---|---|
| 3,953,241 A | 4/1976 | Langer et al. |
| 4,338,382 A | 7/1982 | Fritts |
| 4,788,112 A * | 11/1988 | Kung .............................. 429/54 |

(Continued)

FOREIGN PATENT DOCUMENTS

| | | |
|---|---|---|
| EP | 1626456 | 2/2006 |
| EP | 2270899 | 1/2011 |

(Continued)

OTHER PUBLICATIONS

Hong et al. (KR 10-2004-0105338, machine translation).*

(Continued)

*Primary Examiner* — Carlos Barcena
*Assistant Examiner* — Wojciech Haske
(74) *Attorney, Agent, or Firm* — Fletcher Yoder, P.C.

(57) ABSTRACT

An electrochemical cell is provided including, but not limited to, a can having a side wall that is coupled to a first end and having a cover at a second end of the can to close the second end of the can, a cell element within the can, electrolyte within the can, and a safety device. The can forms a vent at the first end configured to allow gases and/or effluent to exit the can once the pressure inside the can reaches a predetermined amount. The safety device is provided adjacent a first end of the cell element and between the cell element and the first end of the housing. The safety device is configured to exert an additional force on the vent to aid in the deployment of the vent.

32 Claims, 6 Drawing Sheets

(51) Int. Cl.
  *H01M 2/10* (2006.01)
  *H01M 2/02* (2006.01)

(56) References Cited

U.S. PATENT DOCUMENTS

| | | | |
|---|---|---|---|
| 5,394,094 A | | 2/1995 | Wagner |
| 5,523,178 A | | 6/1996 | Murakami et al. |
| 5,609,972 A | | 3/1997 | Kaschmitter et al. |
| 5,662,718 A | * | 9/1997 | Tuttle ............... 29/623.1 |
| 5,834,133 A | * | 11/1998 | Narukawa et al. ........ 429/171 |
| 5,853,912 A | | 12/1998 | Naing et al. |
| 6,063,518 A | | 5/2000 | Dewulf et al. |
| 6,090,501 A | | 7/2000 | Souliac et al. |
| 6,440,605 B1 | | 8/2002 | Kise et al. |
| 6,541,153 B2 | | 4/2003 | Hessabi |
| 6,570,749 B1 | | 5/2003 | Ling et al. |
| 6,599,656 B2 | | 7/2003 | Cittanova |
| 7,378,185 B2 | | 5/2008 | Fujikawa et al. |
| 7,517,607 B2 | | 4/2009 | Kim |
| 7,534,522 B2 | | 5/2009 | Chang et al. |
| 7,670,717 B2 | | 3/2010 | Ohata et al. |
| 7,745,024 B2 | | 6/2010 | Dewulf et al. |
| 7,763,375 B2 | | 7/2010 | Igoris et al. |
| 7,976,786 B2 | | 7/2011 | Damery et al. |
| 2002/0061434 A1 | * | 5/2002 | Holden et al. ............... 429/54 |
| 2004/0053083 A1 | * | 3/2004 | Kobayashi et al. ............ 429/9 |
| 2006/0019150 A1 | | 1/2006 | Rigobert et al. |
| 2006/0115713 A1 | | 6/2006 | Kim et al. |
| 2007/0134548 A1 | | 6/2007 | Wensley et al. |
| 2008/0020270 A1 | | 1/2008 | Park et al. |
| 2008/0057394 A1 | | 3/2008 | Rigobert et al. |
| 2008/0220667 A1 | | 9/2008 | Vigier |
| 2009/0111003 A1 | | 4/2009 | Kim et al. |
| 2009/0148761 A1 | | 6/2009 | Kikuchi et al. |
| 2010/0159314 A1 | | 6/2010 | Kim et al. |
| 2011/0086252 A1 | | 4/2011 | Phillips |
| 2012/0003508 A1 | * | 1/2012 | Narbonne et al. ............... 429/8 |

FOREIGN PATENT DOCUMENTS

| | | |
|---|---|---|
| EP | 2403050 | 1/2012 |
| KR | 20040105338 | 12/2004 |
| WO | 2008 018657 A1 | 2/2008 |

OTHER PUBLICATIONS

European Patent Office, International Searching Authority, International Search Report and Written Opinion for PCT/US2012/058302, Date of mailing Feb. 4, 2013.

* cited by examiner

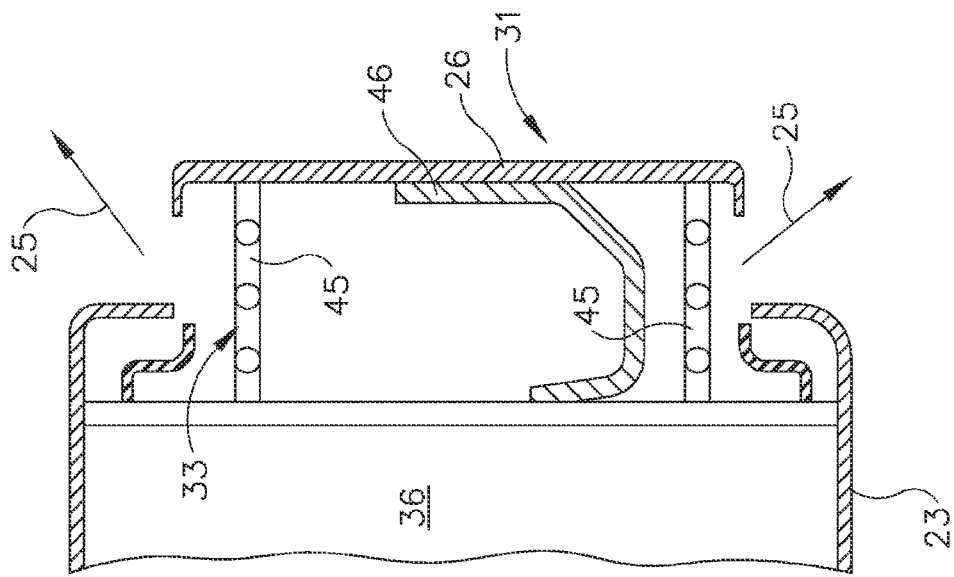
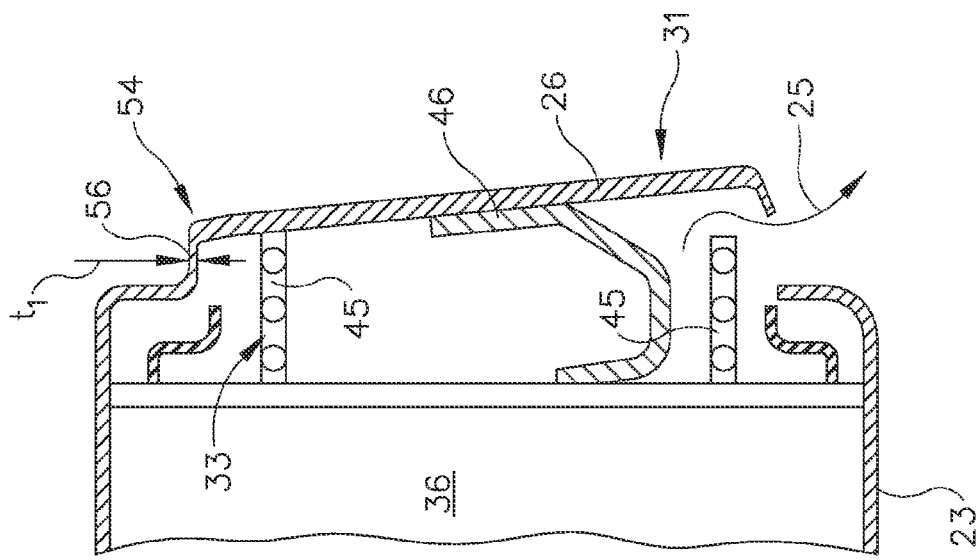

ELECTROCHEMICAL CELL HAVING A SAFETY DEVICE

RELATED APPLICATIONS

The present application is related to and claims benefit under 35 U.S.C. §119(e) from U.S. Provisional Patent Application Ser. No. 61/548,657, entitled, "ELECTROCHEMICAL CELL HAVING A SAFETY DEVICE," filed Oct. 18, 2011, the entire contents of which are hereby incorporated by reference in their entirety to the extent permitted by law.

FIELD OF THE DISCLOSURE

The present application relates generally to the field of batteries and battery systems and, more specifically, to batteries and battery systems that may be used in vehicle applications to provide at least a portion of the motive power for a vehicle using electric power.

BACKGROUND OF THE INVENTION

Vehicles using electric power for all or a portion of their motive power may provide a number of advantages as compared to more traditional gas-powered vehicles using internal combustion engines. For example, vehicles using electric power may produce fewer undesirable emission products and may exhibit greater fuel efficiency as compared to vehicles using internal combustion engines (and, in some cases, such vehicles may eliminate the use of gasoline entirely).

As technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early systems for vehicles using electric power employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in vehicles using electric power. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in a vehicle using electric power (or, alternatively, this feature may allow manufacturers to provide a greater amount of power for the vehicle using electric power without increasing the weight of the vehicle using electric power or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It is also generally known that batteries and battery systems (both lithium-ion and NiMH) are subjected to various environmental and other potentially damaging conditions. For example, battery systems are sometimes provided on the exterior or underside of a vehicle using electric power, subjecting the battery systems to rain, snow, sleet and any other combination of inclement weather. Such battery systems may also be impacted by an object, such as, e.g., during an accident, which may cause a short circuit condition of the battery. Further, abuse of a battery (e.g., a short circuit, or over/under charging) may lead to high temperatures and/or excess pressure within the battery, causing the battery to vent electrolyte contained within the battery.

It would be desirable to provide an improved battery module and/or system for use in vehicles using electric power that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

The present invention is defined by the following claims, and nothing in this section should be taken as a limitation on those claims.

According to one aspect, an electrochemical cell is provided including, but not limited to, a can having a side wall that is coupled to a first end and having a cover at a second end of the can to close the second end of the can, a cell element within the can, electrolyte within the can, and a safety device. The can forms a vent at the first end configured to allow gases and/or effluent to exit the can once the pressure inside the can reaches a predetermined amount. The safety device is provided adjacent a first end of the cell element and between the cell element and the first end of the housing. The safety device is configured to exert an additional force on the vent to aid in the deployment of the vent.

According to one aspect, an electrochemical cell is provided including, but not limited to, a can having a side wall that is coupled to a first end and having a cover at a second end of the can to close the second end of the can, a cell element within the can, electrolyte within the can, and a safety device. The can forms a first vent at the first end configured to allow gases and/or effluent to exit the can once the pressure inside the can reaches a predetermined amount. The safety device is in fluid communication with the first vent. The safety device houses a suppressant which inhibits or limits the chance of a flame when electrolyte is released from the cell.

According to one aspect, a method for controlling heat within an electrochemical cell is provided. The electrochemical cell has a can having a side wall that is coupled to a first end and having a cover at a second end of the can to close the second end of the can. The can forms a vent at the first end configured to allow gases and/or effluent to exit the can once the pressure inside the can reaches a predetermined amount. The electrochemical cell also has a cell element within the can, electrolyte within the can, and a safety device provided adjacent a first end of the cell element and between the cell element and the first end of the housing. The method includes, but is not limited to, exerting an additional amount of force onto the vent by the safety device in order to aid in the deployment of the vent.

According to one aspect, a method for controlling heat within an electrochemical cell is provided. The electrochemical cell has a can having a side wall that is coupled to a first end and having a cover at a second end of the can to close the second end of the can. The can forms a first vent at the first end configured to allow gases and/or effluent to exit the can once the pressure inside the can reaches a predetermined amount. The electrochemical cell also has a cell element within the can, electrolyte within the can, and a safety device provided in fluid communication with the first vent. The safety device houses a suppressant which inhibits or limits the chance of a flame when electrolyte is released from the cell. The method includes, but is not limited to, deploying the first vent once the pressure inside the can reaches a predetermined amount to allow gases and/or effluent to exit the can, and mixing the gases and/or effluent released from the can with suppressant housed by the safety device.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 5A is a detail view a portion of the electrochemical cell of FIG. 5 showing a vent partially open according to an exemplary embodiment.

FIG. 5B is a detail view a portion of the electrochemical cell of FIG. 5 showing a vent fully open according to an exemplary embodiment.

DETAILED DESCRIPTION

Figure 1:
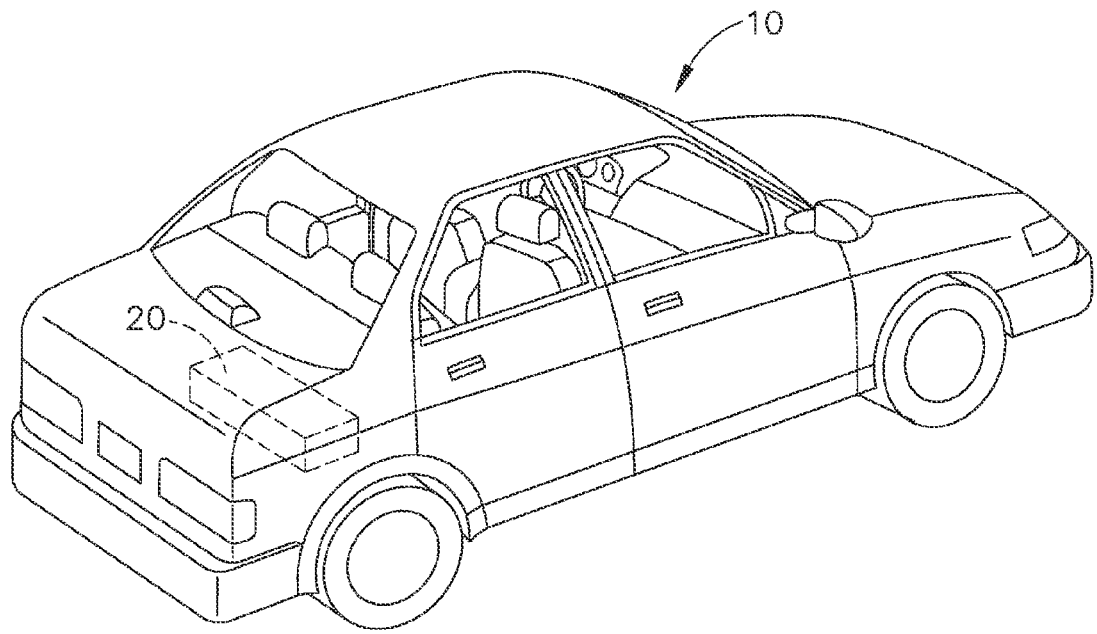
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10.

For the purposes of the present disclosure, it should be noted that the battery modules and systems illustrated and described herein are particularly directed to applications in providing and/or storing energy in xEV electric vehicles. As will be appreciated by those skilled in the art, hybrid electric vehicles (HEVs) combine an internal combustion engine propulsion and high voltage battery power to create traction, and includes mild hybrid, medium hybrid, and full hybrid designs. A plug-in electric vehicle (PEV) is any vehicle that can be charged from an external source of electricity, such as wall sockets, and the energy stored in the rechargeable battery packs drives or contributes to drive the wheels. PEVs are a subcategory of vehicles using electric power for propulsion that include all-electric (EV) or battery electric vehicles (BEVs), plug-in hybrid vehicles (PHEVs), and electric vehicle conversions of hybrid electric vehicles and conventional internal combustion engine vehicles. The term "xEV" is defined herein to include all of the foregoing or any variations or combinations thereof that include electric power as a motive force. Additionally, although illustrated as a car in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

For the purposes of the present disclosure, it should be also noted that the battery modules and systems illustrated and described herein are also particularly directed to applications in providing and/or storing energy in stand-by power units which may be used to provide power for residential homes or businesses which typically rely on power provided from an electrical grid. A stand-by power unit can provide power which may be used as a substitute for power provided from an electrical grid, for any building or device which typically relies on power provided from an electrical grid, such as a residential home or business.

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other consideration.

Figure 2:
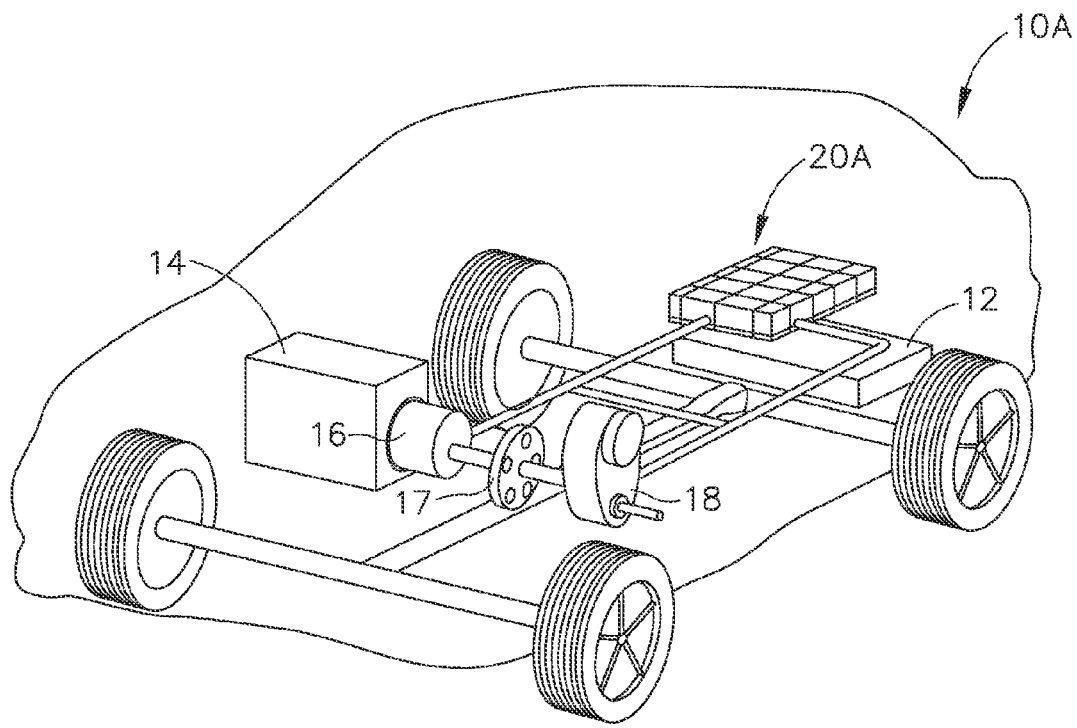
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., HEV, PEV, EV BEV, PHEV, xEV, etc.), and the battery chemistry, among other features, may differ from those shown or described.

Figure 3:
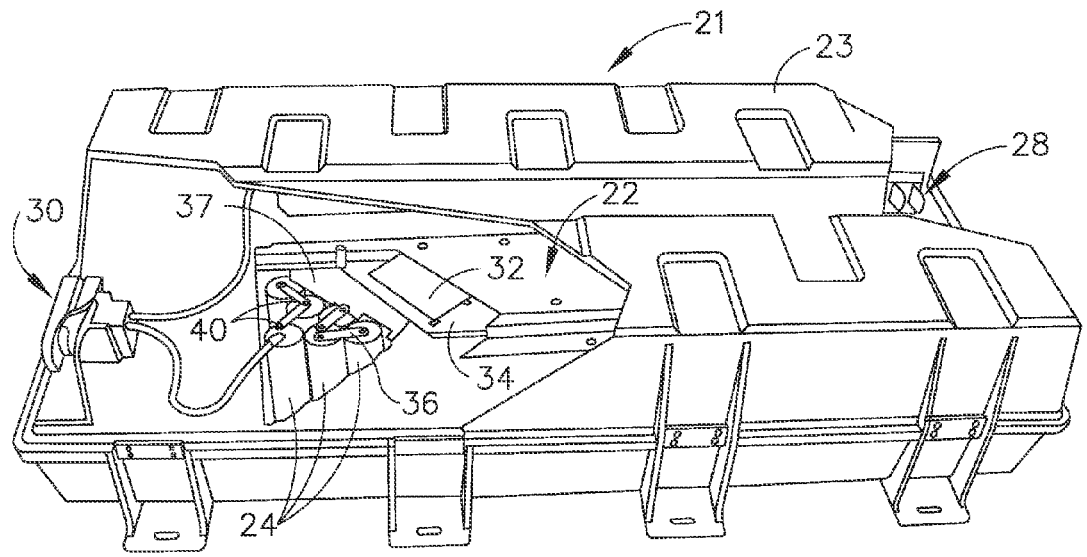
FIG. 3 is a partial cutaway view of a battery system according to an exemplary embodiment.
Figure 4:
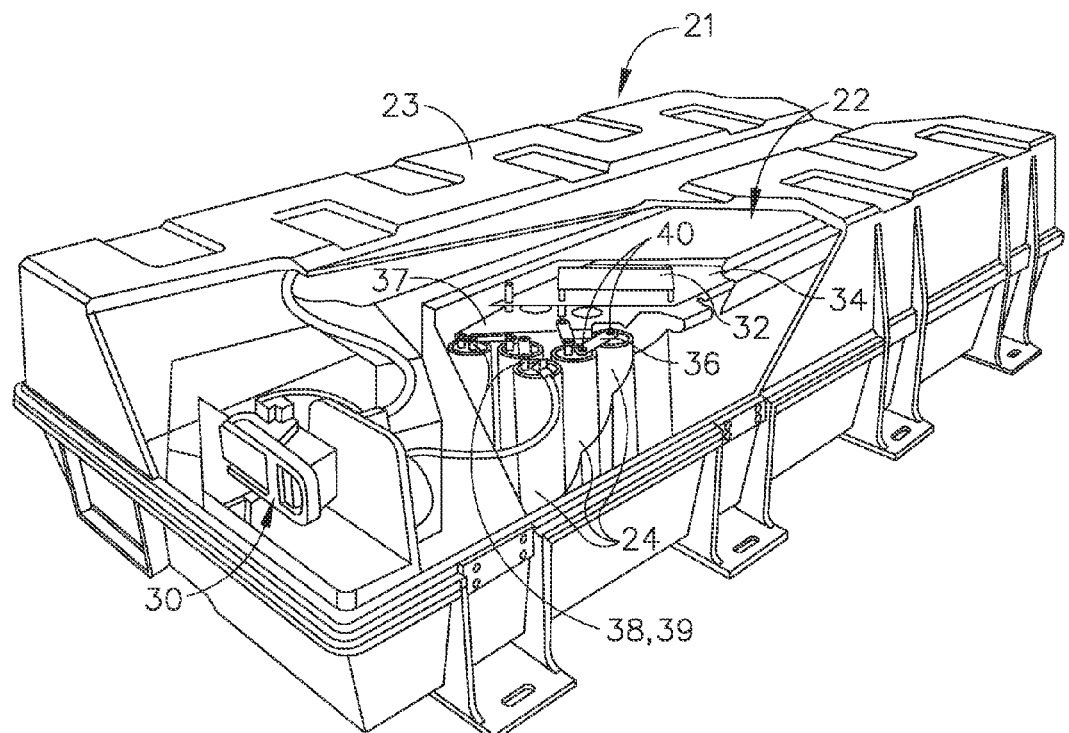
FIG. 4 is another partial cutaway view of the battery system of FIG. 3 according to an exemplary embodiment.

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent 25 (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Figure 5:
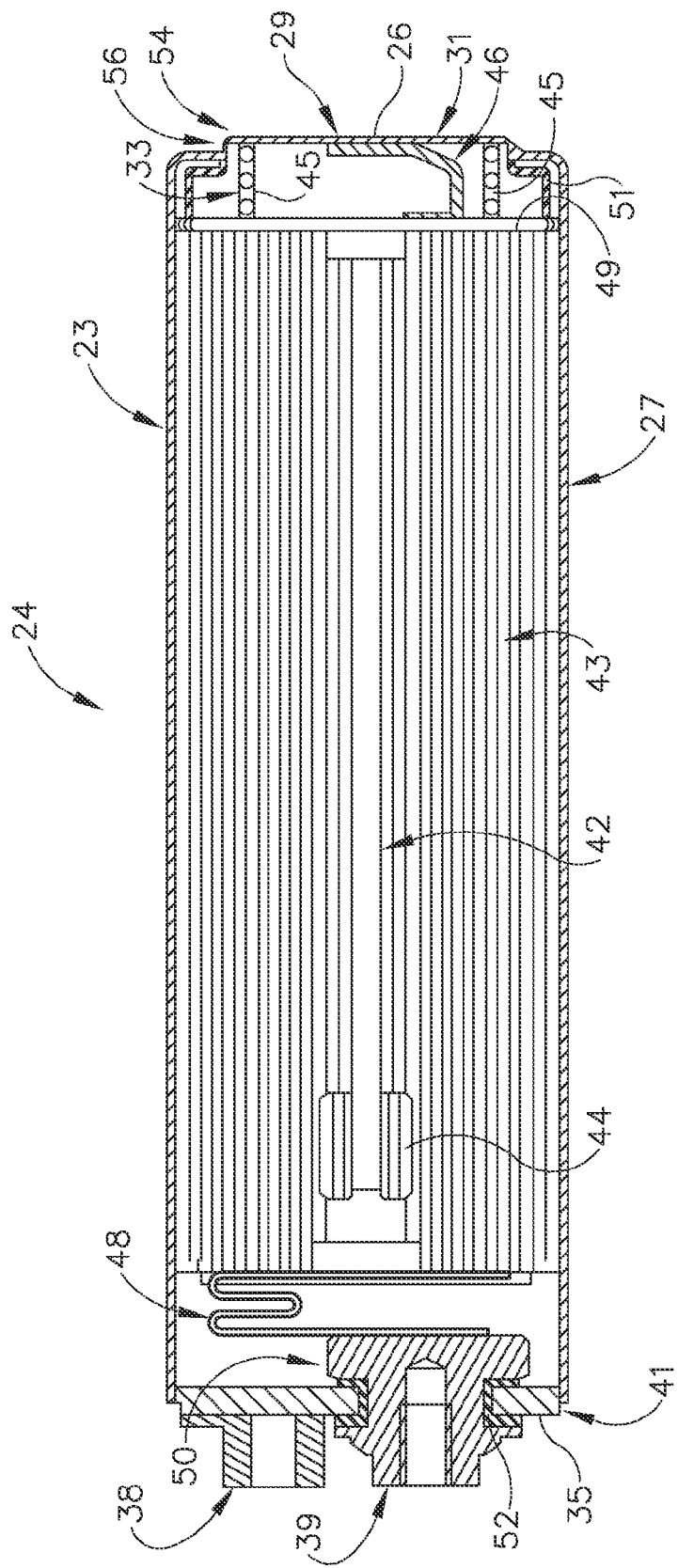
FIG. 5 is a cross-sectional view of an electrochemical cell having a safety device according to an exemplary embodiment.

Referring now to FIG. 5, a side cross-sectional view of an electrochemical cell 24 having a safety device 33 is shown according to an exemplary embodiment. The electrochemical cell 24 generally includes a can or housing 23. The housing 23 includes a cylindrical side wall 27 that is coupled to a first or closed end 31 at a bottom 29 of the housing 23. According to one exemplary embodiment, the cylindrical side wall 27 and the first end 31 are formed as a single unitary member (i.e., the side wall 27 and first end 31 are integral). According to another exemplary embodiment, the side wall 27 and first end 31 are formed as separate components that are later coupled (e.g., welded) together. A cover or lid 35 is provided at a second end 41 of the housing 23 to close the second end 41 of the housing 23.

According to an exemplary embodiment, a cell element 43 is provided within the housing 23. The cell element 43 includes a negative electrode (i.e., anode), a positive electrode (i.e., cathode), and at least one separator provided between the negative electrode and the positive electrode. According to an exemplary embodiment, the electrodes and separators are wound around a central core or mandrel 42 (e.g., by using a drive device 44 coupled to the mandrel 42) to form the cell element 43 (e.g., a wound, jelly-roll cell element).

It should be noted that those skilled in the art will readily recognize that alternative cell configurations may be utilized. For example, the cell 24 may be a prismatic cell having either a wound cell element 43 or prismatic electrode plates. Further, the capacity, size, design, and other features of the electrochemical cell 24 may also vary depending on the specific requirements of the application.

According to an exemplary embodiment, the electrodes are arranged offset from one another such that an edge of the positive electrode extends out beyond a first end of the cell element 43 and an edge of the negative electrode extends out beyond a second end 41 of the cell element 43. As such, each edge of each electrode may be conductively coupled to a corresponding terminal (such as, e.g., a positive terminal 38 or a negative terminal 39 as shown in FIG. 5).

According to the exemplary embodiment as shown in FIG. 5, the edge of the positive electrode is conductively coupled to the first end 26 of the housing 23 via a first connection strip or positive current collector 46. The first end 26 of the housing 23, in turn, is conductively coupled to the cylindrical side wall 27 of the housing 23, which is conductively coupled to the cover 35 at the second end 41 of the housing 23. The cover 35, in turn, is conductively coupled to the positive terminal 38. As such, electrical energy is transferred to/from the positive electrode to the positive terminal 38 (i.e., via the positive current collector 46, second end 41 of the housing 23, side wall 27 of the housing 23, and cover 35).

Likewise, according to the exemplary embodiment as shown in FIG. 5, the edge of the negative electrode is conductively coupled to the negative terminal 39 via a second connection strip or negative current collector 48. The negative terminal 39 extends through an aperture or opening 50 formed in the cover 35 and is electrically insulated from the cover 35 by an insulator or gasket 52. As such, electrical energy is transferred to/from the negative electrode to the negative terminal 39.

It should be noted that those skilled in the art will readily recognize that alternative current collector and/or terminal configurations may be utilized. For example, the current collectors 46, 48 may be eliminated with the terminals 38, 39 directly coupled to the respective electrodes. Additionally, for example, terminals 38, 39 may be disposed on opposite sides of the housing 23, multiple terminals 38 and/or 39 may be coupled to each electrode, terminals 38, 39 may have different shapes, etc.

Referring to FIGS. 5-5B, according to an exemplary embodiment, the cell 24 includes a vent 26. The vent 26 is configured to allow gases and/or effluent 25 to exit the cell 24 once the pressure inside the cell 24 reaches a predetermined amount (e.g., during a rise in cell temperature). When the vent 26 deploys (e.g., activates, opens, separates, etc.), the gases and/or effluent 25 inside the cell 24 exit the cell 24 in order to lower the pressure inside the cell 24 (e.g., as represented by arrows shown in FIGS. 5A-5B). According to an exemplary embodiment, the vent 26 acts as a safety device 33 for the cell 24 during a high pressure occurrence. Preferably, a high pressure occurrence is a condition when the pressure within the cell 24 reaches a predetermined amount. Preferably, the predetermined amount is from 800 kPa to 1200 kPa, and more preferably from 900 kPa to 1100 kPa, and most preferably at least 900 kPa.

According to an exemplary embodiment, the vent 26 is located in the bottom or bottom portion 29 of the housing 23. According to other exemplary embodiments, the vent 26 may be located elsewhere (e.g., such as in the lid or cover 35 of the cell 24). According to another exemplary embodiment, the vent 26 may be located in a cover 35 or bottom 29 that is a separate component from the housing 23 that in turn is coupled to the housing 23 (e.g., by a welding operation).

According to an exemplary embodiment, the bottom 29 of the housing 23 may include a ridge, projection, or ring of material (not shown) to prevent fracture of the vent 26 during handling and/or assembly of the cell 24. The ring of material is intended to provide for a clearance space between the vent 26 and a surface that the cell 24 is set upon. According to an exemplary embodiment, the clearance space is configured to prevent the vent 26 from being accidentally bumped (and deployed) during handling and/or assembly of the cell 24.

According to an exemplary embodiment, the vent 26 includes at least one annular fracture groove 54 (e.g., ring, trough, pressure point, fracture point, fracture ring, thinned area, weakened area, etc.). According to an exemplary embodiment, the annular fracture groove 54 has a V-shaped bottom and is configured to break away (i.e., separate) from the bottom 29 of the housing 23 when the vent 26 deploys. According to other exemplary embodiments, the bottom of the annular fracture groove 54 may have another shape (e.g., rounded shape, curved shape, U-shape, etc.). According to other exemplary embodiments, the annular fracture groove 54 may include a weakened or thinned area 56 (i.e., area of reduced thickness) at the bottom 29 of the housing 23.

As stated earlier, the vent 26 is configured to deploy once the pressure inside the cell 24 reaches a pre-determined amount. When the vent 26 deploys, the annular fracture groove 54 fractures and separates the vent 26 from the rest of the bottom of the housing, allowing the internal gases and/or effluent 25 to escape the cell 24 (e.g., as shown in FIG. 24B). By having the vent 26 separate from the bottom 29 of the housing 23, the vent 26 acts as a current interrupt or current disconnect device. This is because the separation of the vent 26 from the bottom 29 of the housing 23 disrupts the flow of current from the cell element 43 (through the positive current collector) to the housing 23. In this way, the vent 26 acts not only as an over-pressure safety device, but also as a current disconnect device.

In order to help electrically insulate the bottom 49 of the cell element 43 from the bottom of the housing, the cell 24 may include an insulative member (such as, e.g., shown as gasket 51 in FIGS. 5-5B). As shown in FIGS. 5-5B, the gasket 51 is provided adjacent the first end 31 of the housing 23 between the cell element 43 and the bottom 29 of the housing 23. When the vent 26 is deployed, the gasket 51 provides electrical insulation between the bottom 49 of the cell element 43 and the bottom 29 of the housing 23 to ensure that there is no electrical connection between the cell element 43 and the bottom 29 of the housing 23.

According to an exemplary embodiment, the vent 26 (e.g., the annular fracture groove 54) is formed by tooling located external the housing 23. The tooling tolerance is only affected by one side of the tool, allowing for a more consistent annular fracture groove 54, resulting in a more consistent and repeatable opening of the vent 26. The depth, shape, and size of the fracture groove may be easily modified simply by changing the tooling. Additionally, the vent 26 is easy to clean and inspect since the vent 26 (and annular fracture groove 54) is located on an external side of the housing 23.

According to one exemplary embodiment, the cell element 43 does not move during deployment of the vent 26 (i.e., the cell element 43 remains stationary). According to such an exemplary embodiment, the positive current collector 46 is designed to be flexible (e.g., such as shown in FIGS. 5A-B). According to other exemplary embodiments, the cell element 43 may move in order to help deploy the vent 26 (e.g., by "pushing" or "punching" the current collector through the vent). According to such exemplary embodiments, a non-flexible positive current collector 46 may be utilized.

Still referring to FIGS. 5-5B, the electrochemical cell 24 includes a first type of safety device 33 according to an exemplary embodiment. As shown in FIGS. 5-5B, the safety device 33 is a spring 45 (e.g., a compression spring), or a plurality of springs 45. However, according to another exemplary embodiment, the safety device 33 may be a spring washer. The safety device 33 is configured to aid in the deployment of the vent 26.

According to the exemplary embodiment shown in FIGS. 5-5B, the safety device 33 is provided adjacent the first end of the cell 24 between the cell element 43 and the bottom 29 of the housing 23. Specifically, the safety device 33 is shown to contact the bottom 29 of the housing 23 just inside the annular fracture groove 54 of the vent 26. As such, the safety device 33 is configured to exert a force on the vent 26 to aid in the deployment of the vent 26.

As shown in FIG. 5A, the when the vent 26 initially deploys, the vent 26 may only partially open (i.e., the vent 26 may only be partially separated from the bottom 29 of the housing 23). The safety device 33 is configured to exert a force on the vent 26 (e.g., around the circumference of the vent 26) so that the vent 26 fully separates from the bottom 29 of the housing 23. By fully separating from the bottom 29 of the housing 23, the current flowing through the cell 24 is interrupted. In the case where the vent 26 is only partially separated from the bottom 29 of the housing 23, current is still allowed to flow through the cell 24. The safety device 33 ensures full separation of the vent 26 and current interruption of the cell 24 (such as, e.g., shown in FIG. 5B).

According to one exemplary embodiment, the vent 26 may be configured to open at a much lower internal cell pressure when utilizing the safety device 33 (as opposed to not using the safety device 33). Additionally, according to other exemplary embodiments, the force the safety device 33 exerts on the vent 26 may be adjusted (e.g., by using a compressive spring having a higher or lower compressive force). With reference to FIG. 5A, in other embodiments, the current density of the cell 24 may be increased by increasing a thickness $t_1$ of the annular fracture groove 54 of the vent 26 (e.g., by having a smaller annular fracture groove 54 or less of a weakened area). In other words, since the thickness $t_1$ of the annular fracture groove 54 of the vent 26 is increased, more current can flow through the vent 26 before deployment. By having the safety device 33, the vent 26 can still deploy at the predetermined internal pressure because the compressive force exerted on the vent 26 by the safety device 33 combines with the force exerted on the vent 26 by the internal pressure within the cell 24.

According to an exemplary embodiment, the safety device 33 may be coated with an electrically insulative material (e.g., a polymer) such that there is no electrical connection between the cell element 43 or positive current collector 46 and the safety device 33 (and thus the vent 26).

Figure 6:
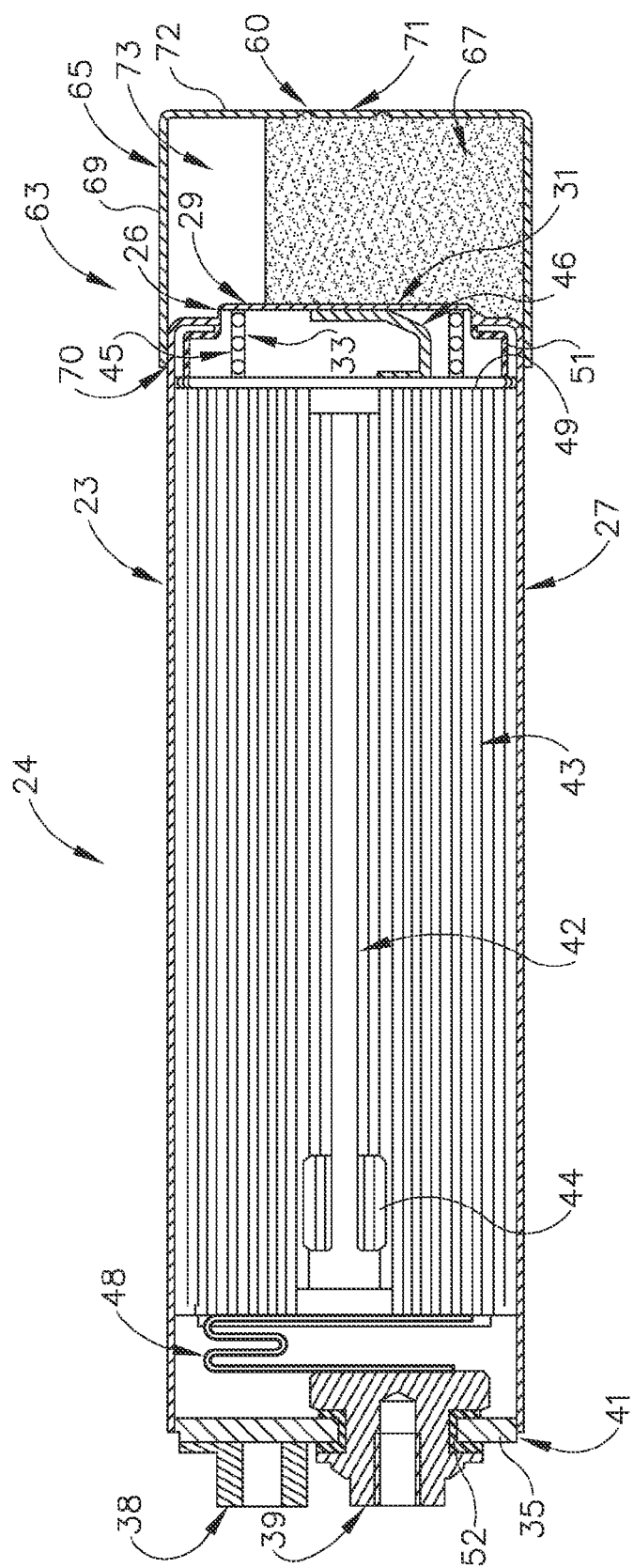
FIG. 6 is a cross-sectional view of an electrochemical cell having a safety device according to another exemplary embodiment.
Figure 7:
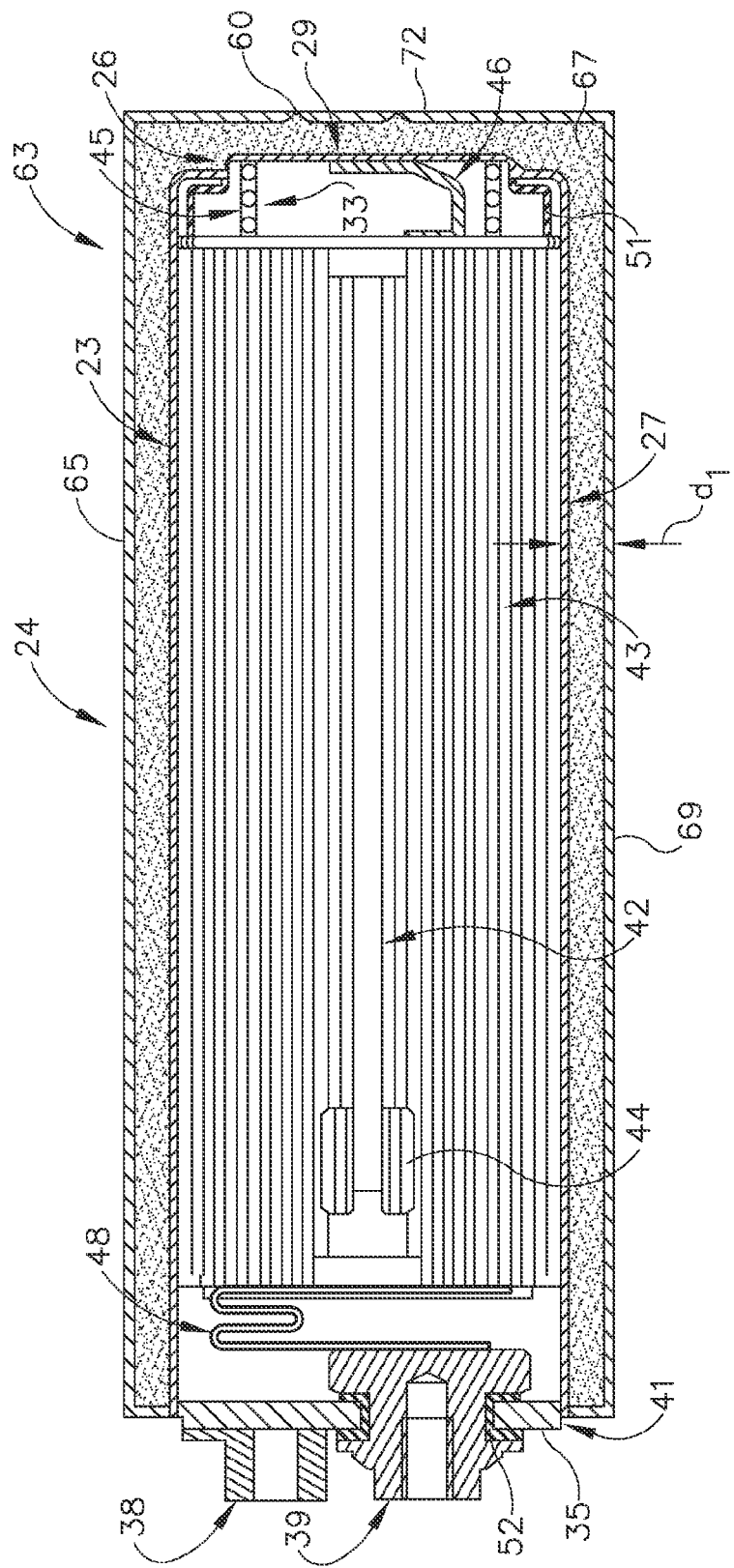
FIG. 7 is a cross-sectional view of an electrochemical cell having a safety device according to yet another exemplary embodiment.

Referring now to FIGS. 6-7, the electrochemical cell 24 includes a second safety device 63 according to another exemplary embodiment. The safety device 63 is configured to contain a suppressant 67 (e.g., a fire or flame retardant, or other heat suppressant) to inhibit or limit the chance of a flame when electrolyte is released from the cell 24 (e.g., when the vent 26 is deployed, or when the side of the cell housing is pierced, e.g., during a vehicle accident). The safety device 63 is in fluid communication with the vent 26, so that when the vent 26 is deployed any gases and/or effluent 25 escaping the housing 23 would be contained by the safety device 63 and mix with suppressant 67 contained within the safety device 63 in order to inhibit or limit the chance of a flame when electrolyte is released from the cell 24. According to an exemplary embodiment, the safety device 63 is filled with the suppressant 67 e.g., through a port or opening (not shown) that is later sealed.

According to an exemplary embodiment, the suppressant 67 is contained in a container or housing 65 that is coupled to the outside of the cell 24. For example, as shown in FIG. 6, the housing 65 includes a cylindrical side wall 69 having a first end 70 that is coupled (e.g., welded, glued, etc.) to the first end 31 of the housing 23 and a second end 71 that is closed by a bottom 72 to form a chamber 73 (e.g., space, compartment, container, cavity, etc.). The chamber 73 is configured to hold the suppressant 67.

According to another exemplary embodiment, such as shown in FIG. 7, the side wall 69 of the housing 65 of the safety device 63 is positioned a predetermined distance $d_1$ away from the cylindrical side wall 27 of the cell 24 and extends along the cylindrical side wall 27 of the cell 24 in a direction generally parallel to the cylindrical side wall 27 of the cell 24. As such, the suppressant 67 is contained within the housing 65 of the safety device 63 along the outside of the cylindrical side wall 27 of the cell 24.

As shown in FIG. 7, according to an exemplary embodiment, the side wall 69 of the housing 65 of the safety device 63 extends generally along the entire length of the cylindrical side wall 27 of the cell 24. However, according to other exemplary embodiments, the side wall 69 of the housing 65 of the safety device 63 may extend along only a portion of the cylindrical side wall 27 of the cell 24 (e.g., a quarter of the way along the cylindrical side wall 27 of the cell 24, halfway along the cylindrical side wall 27 of the cell 24, three-quarters along the cylindrical side wall 27 of the cell 24, etc.).

According to an exemplary embodiment, the suppressant 67 is a material or chemical that behaves as a flame inhibitor or otherwise limits heat propagation. For example, the suppressant 67 may, in a physical char-forming process, build up an isolating layer between condensed and gas phases to stop combustion, and/or may, in a chemical radical-scavenging process, terminate radical chain reactions of combustion.

As an example, dimethyl methyl phosphonate (DMMP) is believed to be a good free radical inhibitor that captures H. and HO. in the flame zone to weaken or terminate combustion chain branching reactions. According to other exemplary embodiments, the suppressant 67 may effectively suppress flames or heat propagation by other means or mechanisms. According to still other exemplary embodiments, the suppressant 67 may be 2,4,6-tribromophenol, dibromomethane, tris (2-chloroethyl) phosphate, triphenylphosphate (TPP), diphenyl phosphate, tris (2,2,2-tribluoroethyle) phosphate, chloroacetyl chloride, tribromoethanol, cyclophosphazene, tris (2,2,2-trifluoroethyl) phosphate (TFP), trimethyl phosphate (TMP), triethyle phosphate (TEP), an organic phosphorous compound or its halogenated derivatives, other flame retardant compounds, or combinations thereof (e.g., based on cost, relative boiling point, etc.).

According to an exemplary embodiment, when the electrolyte enters the housing 65 of the safety device 63, the suppressant 67 mixes with the electrolyte, such as by diffusion or dynamic flow as the electrolyte enters the housing 65 of the safety device 63. The suppressant 67, as described above, causes the electrolyte to react with the suppressant 67, and not with oxygen.

According to another exemplary embodiment, the vented gases 25 from the electrochemical cells 24 may include flammable compounds that may react with oxygen (e.g., oxygen in atmospheric air) to produce a flame under certain circumstances. To reduce the chance of a flame occurring, a substance, material, or matter (e.g., a gas, liquid, or solid) may be provided in the chamber 73 formed by the housing 65 of the safety device 63 to displace the oxygen that would otherwise be in the chamber 73. By displacing the oxygen, the vented gases 25 will not mix with (and will not potentially react with) the oxygen.

According to one exemplary embodiment, such a substance (i.e., the oxygen displacing material) may be any of the suppressants 67 described above. According to another exemplary embodiment, the oxygen displacing material is an inert gas. Because the inert gas is not reactive (under normal circumstances), the chances of a flame are reduced. Additionally, because the vented gases 25 are allowed to expand when exiting the electrochemical cell 24 and entering the chamber 73, the vented gases 25 are allowed to cool. Further, by allowing the vented gases 25 to mix with the inert gas (which is at a lower temperature than the vented gases), the vented gases 25 are allowed to cool even more, thus further reducing the chance of a flame.

According to one exemplary embodiment, the inert gas is argon. However, according to other exemplary embodiments, the inert gas may be any elemental or molecular gas that is not reactive under normal circumstances (such as, e.g., nitrogen, helium, neon, krypton, xenon, radon, etc.). According to another exemplary embodiment, the oxygen displacing material may be a non-flammable foam or other suitable substance that is non-reactive with the gases and/or effluent 25 that may be vented from the electrochemical cells 24. According to an exemplary embodiment, the non-flammable foam may be a hard or soft foam.

According to an exemplary embodiment, the suppressant 67 may be in a gas, liquid, or solid form. In any case, the amount of the suppressant 67 within the housing 65 of the safety device 63 is such that the vent 26 of the cell 24 is still allowed to deploy freely into the safety device 63 (i.e., the suppressant 67 does not interfere with the deployment of the vent 26). According to an exemplary embodiment, the safety device 63 contains approximately 15% suppressant 67 by weight as compared to the electrolyte contained in the electrochemical cell 24. According to other embodiments, the safety device 63 contains between approximately 1% and 15% suppressant 67 by weight. Those skilled in the art will readily recognize that other amounts of suppressant 67 may be provided, whether measured in an absolute amount or relative to the electrolyte. Further, those skilled in the art will recognize that, depending on the suppressant 67 used, providing more suppressant 67 may increase the electrochemical cell 24's fire retarding ability and overall safety of the electrochemical cell 24.

According to another exemplary embodiment, the suppressant 67 may be contained within a separate container or bag (not shown) within the housing 65 of the safety device 63. For example, suppressant 67 may be contained within a low density polyethylene material approximately 1-2 mil thick. According to an exemplary embodiment, the bag material is configured to melt upon release of the electrolyte from the cell 24 to release the suppressant 67 therein to mix with the electrolyte. According to other exemplary embodiments, the bag or container may be a polyethylene, a polymer, a copolymer, or an aluminum laminate material.

Those skilled in the art will readily recognize that different bag configurations, materials, and thicknesses may be chosen depending on desired characteristics. For example, materials with a lower or higher melting temperature may be used for the bag or container.

According to the exemplary embodiments shown in FIGS. 6-7, the housing 65 of the safety device 63 includes a vent 60. The vent 60 of the safety device 63 may be configured similar to the vent 26 of the cell 24, or according to other exemplary embodiments, may be configured differently. For example, the vent 26 of the cell 24 may be configured to deploy (i.e., activate, separate, etc.) at a first pressure while the vent 60 of the safety device 63 is configured to deploy at a second pressure that is greater than the first pressure. This would allow for two-stage venting where the first vent 26 (i.e., the vent 26 of the cell 24) would deploy at a first, lower internal pressure of the cell 24 to interrupt the current flowing through the cell 24. Deployment of the first vent 26 would also allow the vented electrolyte to mix with the suppressant 67 contained within the safety device 63. Then, if needed, the second vent 60 (i.e., the vent 60 of the safety device 63) could deploy.

In one exemplary embodiment, the housing 65 of the safety device 63 is made from an inert material, such as polypropylene or low density polyethylene. According to another exemplary embodiment, the housing 65 of the safety device 63 is made from a metal such as aluminum (or aluminum alloy), steel, or other suitable material. Those skilled in the art will recognize that materials, configurations, and manufacturing methods may be chosen according to desired characteristics, such as strength, formability of the material, coupling configurations with the cell 24, etc.

A particular advantage of the suppressant 67 contained within the safety device 63 is that the suppressant 67 is separate from the electrolyte during normal operation of the electrochemical cell 24. This provides improved performance over electrochemical cells 24 having electrolytes premixed with a suppressant 67. Further, suppressants 67 may be used regardless of their electrochemical performance, since the suppressant 67 is not within the cell 24 during operation of the cell 24. Suppressants 67 may be chosen instead based on cost, quality, availability, cell chemistry, or environmental concerns, for example, rather than electrochemical performance.

As shown in FIGS. 6-7, the safety device 63 containing the suppressant 67 may be used in combination with the safety device 33 (e.g., spring, washer, etc.) used to aid in the deployment of the vent 26 of the cell 24. However, according to another exemplary embodiment, the two safety devices 33, 63 need not be used in combination (i.e., the safety device 63 containing the suppressant 67 may be used without the safety device 33 used to deploy the vent 26 of the cell 24).

Those skilled in the art will readily recognize that the features disclosed in the embodiments described above may also be incorporated with different electrochemical cell configurations. For example, the features may be applied to electrochemical cells 24 having different configurations or chemistry and/or cells used individually or as part of a larger system (e.g., within a battery system such as shown in FIGS. 1-4).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the electrochemical cell 24 having a safety device 33 as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. An electrochemical cell comprising:
a can having a side wall that is coupled to a first end of the can, wherein the can includes a vent at the first end of the can and the vent is configured to tear along a fracture groove to enable gases and/or effluent to exit the can, through the vent, when a first pressure inside the can reaches a first pressure threshold;
a cell element within the can;
electrolyte within the can;
a spring compressed between the cell element and a first side of the vent facing the cell element, wherein the spring is configured to facilitate tearing along the fracture groove after the first pressure reaches the first pressure threshold; and
a suppressant container provided adjacent a second side of the vent opposite to the first side, wherein suppressant is contained inside the suppressant container and the vent is configured to open toward the inside of the suppressant container.

2. The electrochemical cell of claim 1 wherein the can is cylindrical.

3. The electrochemical cell of claim 1 wherein the can is prismatic.

4. The electrochemical cell of claim 1, wherein the spring exerts enough force on the vent so as to fully separate the vent at the fracture groove, once the first pressure reaches the first pressure threshold, from the first end of the can and interrupt any current flowing through the cell element.

5. The electrochemical cell of claim 1, wherein the spring is coated with an electrically insulative material.

6. The electrochemical cell of claim 1, wherein the suppressant is configured to inhibit or limit a chance of a flame when the vent deploys from the first end of the can.

7. The electrochemical cell of claim 1, wherein a side wall of the suppressant container extends generally along an entire length of the side wall of the can.

8. The electrochemical cell of claim 1, wherein the suppressant container includes a second vent.

9. The electrochemical cell of claim 8, wherein the vent of the can is configured to deploy at the first pressure threshold and the second vent of the suppressant container is configured to deploy at a second pressure threshold that is greater than the first pressure threshold.

10. The electrochemical cell of claim 1, wherein the suppressant container is made from an inert material.

11. The electrochemical cell of claim 1, wherein the side wall and the first end are formed as a single unitary member.

12. The electrochemical cell of claim 1, wherein the side wall and first end are separate components that are coupled together.

13. The electrochemical cell of claim 1, wherein the fracture groove is located on an external surface of the first end of the can and the fracture groove comprises an annular thinned area configured to tear when the first pressure reaches the first pressure threshold.

14. An electrochemical cell comprising:
a can having a side wall that is coupled to a first end of the can, wherein the can includes a first vent at the first end of the can, and the first vent is configured to tear along a fracture groove to allow gases and/or effluent to exit an inside of the can when a total pressure against a first side of the first vent facing the inside of the can, including a first pressure of the gases and/or effluent, reaches a first predetermined amount;
a cell element within the can;
electrolyte within the can;
a spring compressed between the cell element and the first side of the first vent, wherein the spring is configured to exert a second pressure of the total pressure against the first side of the first vent; and
a housing in fluid communication with a second side of the first vent opposite to the first side of the first vent, wherein the housing houses a fire suppressant in a chamber of the housing, and the first vent enables the gases and/or effluent to exit from the inside of the can to the chamber of the housing.

15. The electrochemical cell of claim 14 wherein the can is cylindrical.

16. The electrochemical cell of claim 14 wherein the can is prismatic.

17. The electrochemical cell of claim 14, wherein the electrochemical cell is a lithium-ion cell, a nickel-metal-hydride cell, or a lithium polymer cell.

18. The electrochemical cell of claim 14, wherein a second side wall of the housing extends generally along an entire length of the side wall of the can.

19. The electrochemical cell of claim 18, wherein the housing is made from an inert material.

20. The electrochemical cell of claim 14, wherein the housing includes a second vent.

21. The electrochemical cell of claim 20, wherein the second vent of the housing is configured to deploy if a second total pressure against an inner surface of the second vent exceeds a second predetermined amount that is greater than the first predetermined amount.

22. The electrochemical cell of claim 14, wherein the side wall of the can and the first end of the can are separate components.

23. A standby power unit comprising a battery system having the electrochemical cell of claim 14, wherein the standby power unit provides power which may be used as a substitute for power provided from an electrical grid.

24. A battery module, comprising:
an electrochemical cell having a housing, a cell element disposed within the housing, a vent formed in a first end of the housing and configured to tear along a fracture groove when a first pressure against an inner surface of the vent reaches a predetermined amount, a spring disposed between the cell element and the vent and configured to exert the first pressure against the inner surface of the vent, and a suppressant container disposed adjacent an outer surface of the vent opposite the inner surface and configured to retain suppressant, wherein the vent is configured to deploy outwardly from the first end of the can toward an inside of the suppressant container when the first pressure against the inner surface of the vent reaches the predetermined amount.

25. The battery module of claim 24, wherein the housing comprises a first sidewall extending from, and coupled to, the first end of the housing.

26. The battery module of claim 25, wherein the first sidewall of the housing and the first end of the housing are separate components welded together.

27. The battery module of claim 25, wherein the suppressant container comprises a second sidewall extending substantially parallel to the first sidewall of the housing.

28. The battery module of claim 27, wherein an interior portion of the suppressant container is defined by the housing of the electrochemical cell and an outer wall of the suppressant container surrounding at least a portion of the housing, wherein the outer wall comprises the second sidewall, and wherein the inside of the suppressant container is disposed between the housing of the electrochemical cell and the outer wall of the suppressant container.

29. The battery module of claim 28, wherein the second sidewall of the outer wall of the suppressant container extends an entire length of the first sidewall of the housing, and the inside of the suppressant container extends between the second sidewall of the suppressant container and the first sidewall of the suppressant container.

30. The battery module of claim 27, wherein the second sidewall extends a partial length of the first sidewall but does not extend along the first sidewall beyond the cell element.

31. The battery module of claim 24, wherein the electrochemical cell is a prismatic lithium-ion electrochemical cell.

32. The battery module of claim 24, wherein the suppressant container comprises a second vent.

* * * * *